United States Patent

[11] 3,560,645

[72] Inventor Howard B. Wallace, Jr. Syracuse, N.Y.
[21] Appl. No. 23,387
[22] Filed Mar. 27, 1970
[45] Patented Feb. 2, 1971
[73] Assignee General Electric Company a corporation of New York

[54] TELEVISION CAMERA GAIN CONTROL CIRCUIT WITH COMPRESSED WIDE CONTRAST RANGE RESPONSE
14 Claims, 4 Drawing Figs.

[52] U.S. Cl. .......... 178/7.1
[51] Int. Cl. .......... H04n 5/20
[50] Field of Search .......... 178/7.1, 7.1DC, 7.2, 7.2E, 5.4ACC, 6Gamma, 6VBW

[56] References Cited

UNITED STATES PATENTS

| | | | |
|---|---|---|---|
| 2,692,333 | 10/1954 | Holmes .......... | 328/143 |
| 3,458,652 | 7/1969 | McMann .......... | 178/7.3 |
| 3,465,094 | 9/1969 | Biernson et al. .......... | 178/5.4 |
| 3,497,724 | 2/1970 | Harper .......... | 307/261 |

*Primary Examiner*—Robert L. Griffin
*Assistant Examiner*—John C. Martin
*Attorneys*—Marvin Snyder, Joseph Shanley, Frank L. Neuhauser, Oscar B. Waddell and Joseph B. Forman

ABSTRACT: Loss of detail in the bright portion of an image of a scene having a bright portion and a dark portion, as viewed by a vidicon pickup tube, is avoided by compressing the video signal in excess of a predetermined threshold amplitude. The signal is black-clipped at the predetermined threshold amplitude, and the entire portion of signal above this amplitude is compressed within a predetermined amplitude range by controlled attenuation circuitry whenever the signal exceeds this range. The portion of signal thus compressed is added to the portion of signal extant below the predetermined threshold amplitude to produce an amplitude-limited output signal which retains detail in the dark portion of the image while preserving most of the detail in the bright portion.

INVENTOR:
HOWARD B. WALLACE, JR.
BY Marvin Snyder
HIS ATTORNEY.

INVENTOR:
HOWARD B. WALLACE, JR.
BY Marvin Snyder
HIS ATTORNEY.

TELEVISION CAMERA GAIN CONTROL CIRCUIT WITH COMPRESSED WIDE CONTRAST RANGE RESPONSE

INTRODUCTION

This invention relates to television cameras, and more particularly to a gain control circuit for extending the contrast range response capability of a television camera.

An important criterion in evaluating performance of monochrome and color television cameras is the degree of fidelity with which the camera reproduces, as viewed on a monitor, the gray scale of a scene being televised. This, in turn, depends upon the maximum contrast ratio capability of the camera, which may be defined as the ration of peak white reflectance to reference black reflectance, over which the camera can accomplish linear or faithful reproduction. While a camera having a larger maximum contrast ratio capability yields better fidelity of gray scale reproduction, the video signal at the output of the camera must be prevented from exceeding a specific peak value, regardless of the gray scale or contrast ratio of the scene being televised; otherwise, the signal will exceed the maximum signal-handling capability of the circuitry through which it passes and introduce aberrations in the televised image. A white clipper is usually incorporated in cameras designed to televise live scenes in order to protect the camera circuitry and circuitry subsequent to the camera against the effects of excessive signal amplitudes which would others otherwise arise out of viewing scenes having extremely bright portions thereof. Accordingly, present-day cameras are typically designed with maximum contrast ratio capabilities of about 40 to 1.

In actual employment of live cameras, contrast ratios in excess of the camera design limit are often encountered. Such situation can occur, for example, in televising an outdoor sports event where half of the playing field is in shadow and half in bright sunlight. The vidicon pickup tube, which tp typically is of the lead oxide type used in many live monochrome and color television cameras, it not altogether satisfactory when employed in such situation because its linear transfer characteristic provides it with capability to reproduce contrast ratios considerably higher than the system receiving the signal from the camera is designed to accept. Hence, if the camera is exposed to faithfully reproduce the dark half of the playing field on a monitor, the video signal resulting from exposure of the camera to the bright side of the field may exceed the peak permissible signal at the output of the camera. Under these circumstances, the video signal will be white-clipped, resulting in a severe loss of detail in the bright side of the playing field when the televised image is viewed on a monitor.

By inserting a gain control circuit of the type described herein in the camera output circuitry, the aforementioned loss of detail in bright portions of scenes having high contrast ratios is minimized. The gain control circuit has an amplitude threshold selected at an amplitude level below the maximum allowable output signal, and provides substantially unity gain for input signals of amplitude less than or equal to the maximum allowable output signal level. When the input signal to the gain control circuit exceeds the maximum allowable output signal level, the circuit compresses the input signal above the threshold level so that the output signal does not exceed the maximum allowable amplitude. Consequently, when televising scenes with contrast ratios in excess of the camera design limit, most of the detail in the bright portion of the image is preserved and reproduced, where hitherto such detail could not be reproduced. Television monitor gray scale reproduction below the threshold amplitude remains unaffected by the gain control circuit, and contrast ratios less than or equal to the design limit of the camera are also unaffected by the gain control circuit.

Accordingly, one object of the invention is to provide a television camera capable of reproducing, with a high degree of detail, scenes having high contrast ratios.

Another object is to provide circuitry for permitting a television camera to reproduce, with a high degree of detail, a very bright portion of a scene of high contrast ratio being viewed by the camera, without loss of detail in the dark portion of the scene.

Another object is to provide apparatus which compresses, only above a predetermined threshold amplitude, the video signal produced by a television camera.

Another object is to provide a television camera having a usable maximum contrast ratio capability of at least 120 to 1.

Briefly, in accordance with a preferred embodiment of the invention, a television camera gain control circuit with extended contrast range response comprises means for clipping the black level of video signal at a first predetermined amplitude level. The portion of signal above this amplitude is furnished to controlled signal attenuating circuitry preset to attenuate video signals of amplitude above the first predetermined level whenever the video signal exceeds a second predetermined amplitude level greater than the first predetermined amplitude level. Means are provided for subtracting the portion of video signal above the first amplitude level from the sum of the video signal plus the output signal of the controlled signal attenuation circuitry to produce an amplitude limited video signal which retains detail in the portions of signal representing dark regions of the image while preserving most of the detail in the portions of signal representing the bright regions of the image.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
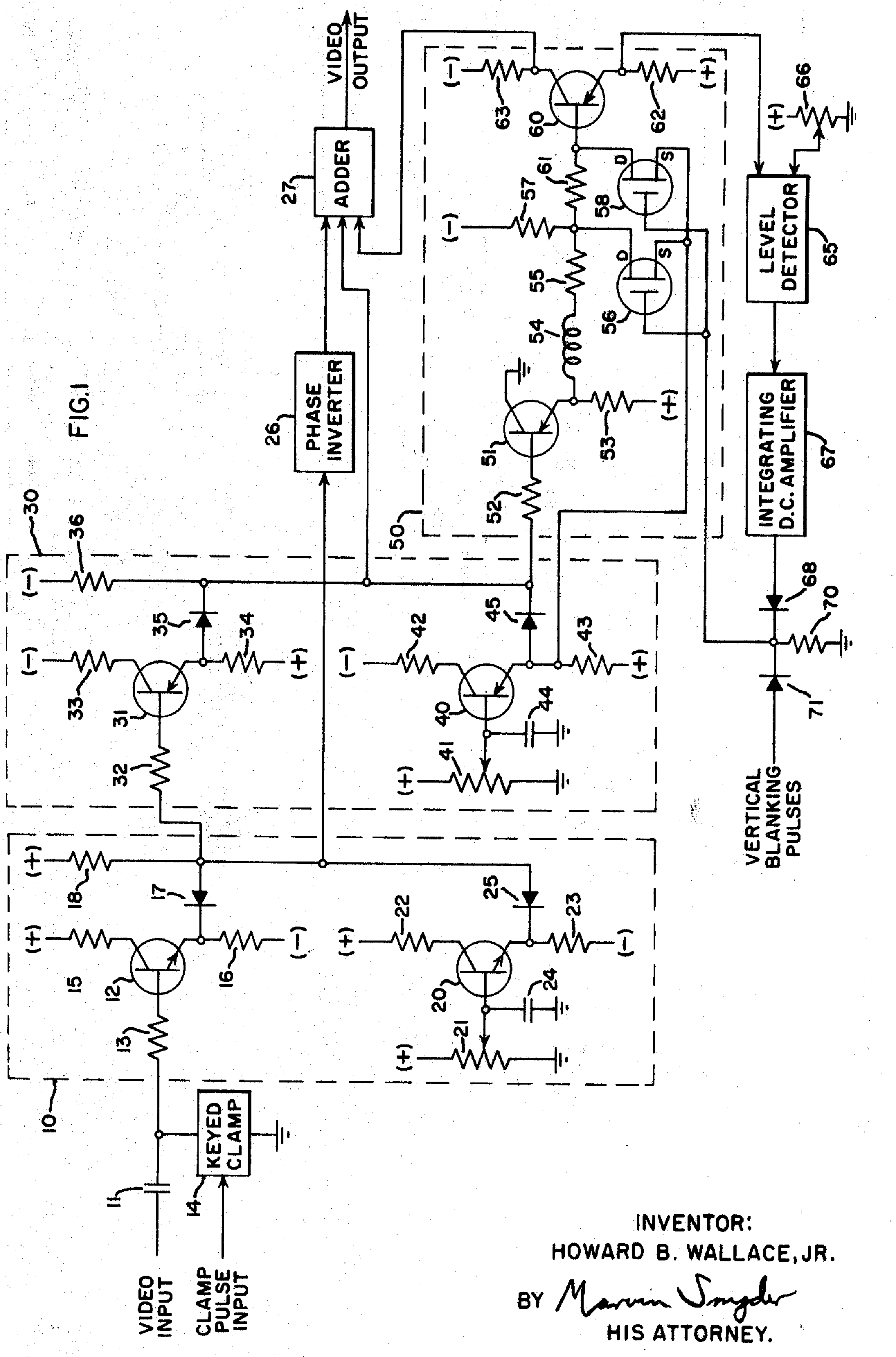
FIG. 1 is a schematic diagram of a preferred embodiment of the gain control circuit of the invention.

FIG. 1 illustrates the portion of television camera circuitry which comprises the gain control circuit of the instant invention. In FIG. 1, video input signals are furnished through a coupling capacitance 11 and a coupling resistance 13 to the base of an NPN transistor 12 connected in an emitter follower configuration in a white clipper circuit 10, so called because the circuit clips at high amplitudes of video input signals, which represent white portions of the scene being viewed. Transistor 12 receives positive collector bias through a collector biasing resistance 15 and a negative emitter bias through an emitter load resistance 16. Video input signals furnished to the base of transistor 12 are clamped to ground potential at the horizontal scan line frequency rate by a keyed clamp circuit 14 in response to a single clamp pulse produced by the camera circuitry during each horizontal blanking interval. A normally forward-biased diode 17 receives positive potential at its anode through a biasing resistance 18. The cathode of diode 17 is connected to the emitter of transistor 12.

The maximum positive amplitude of voltage on the anode of diode 17 is established by an NPN transistor 20 connected in an emitter follower configuration. Positive base bias of manually adjustable amplitude is furnished to transistor 20 from a potentiometer 21, while positive collector bias is furnished through a biasing resistance 22. Negative emitter bias is furnished to transistor 20 through a load resistance 23. A capacitance 24, connected between the base of transistor 20 and ground, serves to short circuit to ground transient voltages produced when the setting of potentiometer 21 is manually readjusted, preventing transistor 20 from responding to spurious transient voltages. The anode of a diode 25 is connected to the anode of diode 17, while the cathode of diode 25 is connected to the emitter of transistor 20.

Output signals from white clipper 10 are supplied from the anodes of diodes 17 and 25 to the input of a phase inverter 26. The output of phase inverter 26 is connected to one input of a three-input algebraic adder circuit 27 which produces the gain control circuit video output signal. The output signal produced by adder 27 corresponds to the inverted algebraic sum of the input signals applied thereto. In addition, output signals from white clipper circuit 10 are furnished through a coupling resistance 32 to the base of a PNP transistor 31 of a black clipper circuit 30, so called because the circuit clips at lower amplitudes of video input signals, which represent dark portions of the scene being viewed. Transistor 31 is connected in a emitter follower configuration.

Negative collector bias is furnished to transistor 31 through a collector biasing resistance 33, while positive emitter bias is furnished to transistor 31 through load resistance 34. A diode 35, which receives negative biasing potential at its cathode through a biasing resistance 36, is reverse-biased in absence of any video input signal. The anode of diode 35 is connected to the emitter of transistor 31. Amplitude of bias on the cathode of diode 35 is controlled by a PNP transistor 40, connected in an emitter follower configuration. Manually adjustable positive base bias is furnished to transistor 40 from a potentiometer 41. Negative collector bias is furnished to transistor 40 through a collector biasing resistance 42, and positive emitter bias is furnished to transistor 40 through load resistance 43. A capacitance 44, connected between the base of transistor 40 and ground, serves to short circuit to ground any spurious transient voltages produced as a result of a change in the manually-adjusted setting of potentiometer 41. The cathode of a diode 45 is connected to the cathode of diode 35, while the anode of diode 45 is connected to the emitter of transistor 40.

The output signal of black clipper stage 30 is furnished from the cathodes of diodes 35 and 45 to a second input of three-input adder circuit 27. In addition, the output signal of black clipper 30 is coupled through a coupling resistance 52 to the base of a PNP transistor 51 of a controlled voltage attenuation circuit 50. Transistor 51 is connected in an emitter follower configuration receiving positive emitter bias through load resistance 53 while the collector of transistor 51 is grounded. Output signals from transistor 51 are furnished from the emitter of the transistor through an inductance 54 in series with a resistance 55 to the drain electrode D of a first insulated gate field effect transistor (herein designated FET) 56. Negative drain bias is furnished to FET 56 through a biasing resistance 57. Source electrode S of FET 56 is connected to the emitter of transistor 40. Inductance 54 serves to compensate for circuit capacitance in order to provide a uniform frequency response over the band of video input frequencies normally applied to the circuit.

The drain electrode D of a second insulated gate field effect transistor 58 is coupled directly to the base of PNP transistor 60, and is also coupled to the drain electrode D of FET 56 through a coupling resistance 61. The source electrode S of FET transistor 58 is connected to the emitter of transistor 40.

Positive emitter bias is furnished to transistor 60 through a load resistance 62, while negative collector bias is furnished to transistor 60 through a load resistance 63. Thus, signals which are 180° out of phase with signals furnished to the base of transistor 60 are furnished directly from the collector of transistor 60 to the third input of adder circuit 27. In addition, signals which are in phase with input signals furnished to the base of transistor 60 are furnished from the emitter of transistor 60 to a voltage level detector circuit 65. The minimum amplitude of positive voltage sensed by detector 65 is manually selectable from the variable tap of a potentiometer 66 connected between a source of positive voltage and ground.

Output signals from level detector 65 are amplified by an integrating DC amplifier 67 and furnished, after a delay inherent in amplifier 67, through a forward-connected diode 68 to the gate electrodes of each of FETs 56 and 58. The cathode of diode 68 is connected to ground through a load resistance 70. In addition, inverted, or positive-going, vertical blanking pulses may be furnished, if desired, through a forward-connected diode 71 to the source electrodes S of FETs 56 and 58.

In operation, there are three possible video input signal amplitude conditions to consider in regard to the system of FIG. 1. These conditions involve operation of the system when the video input signal amplitude is, first, at or below a normal amplitude level, second, greater than the normal amplitude level but less than the white clipping level, and third, greater than the white clipping level. Waveforms representing each of these conditions are illustrated in FIGS. 2A, 2B and 2C, respectively, with the input waveform for each of these conditions assumed to be of the shape represented by waveforms 101, 111 or 121, and 131, respectively, Instants $t_1$ and $t_2$ each occur, with respect to initiation of the video input waveform at time $t_0$, at indentical times in each of FIGS. 2A, 2B and 2C, and amplitude scales are identical for each waveform in each of these FIGS.

Video Input Signal Amplitude at or Below a Normal Level

Figures 2A, 2B, 2C:
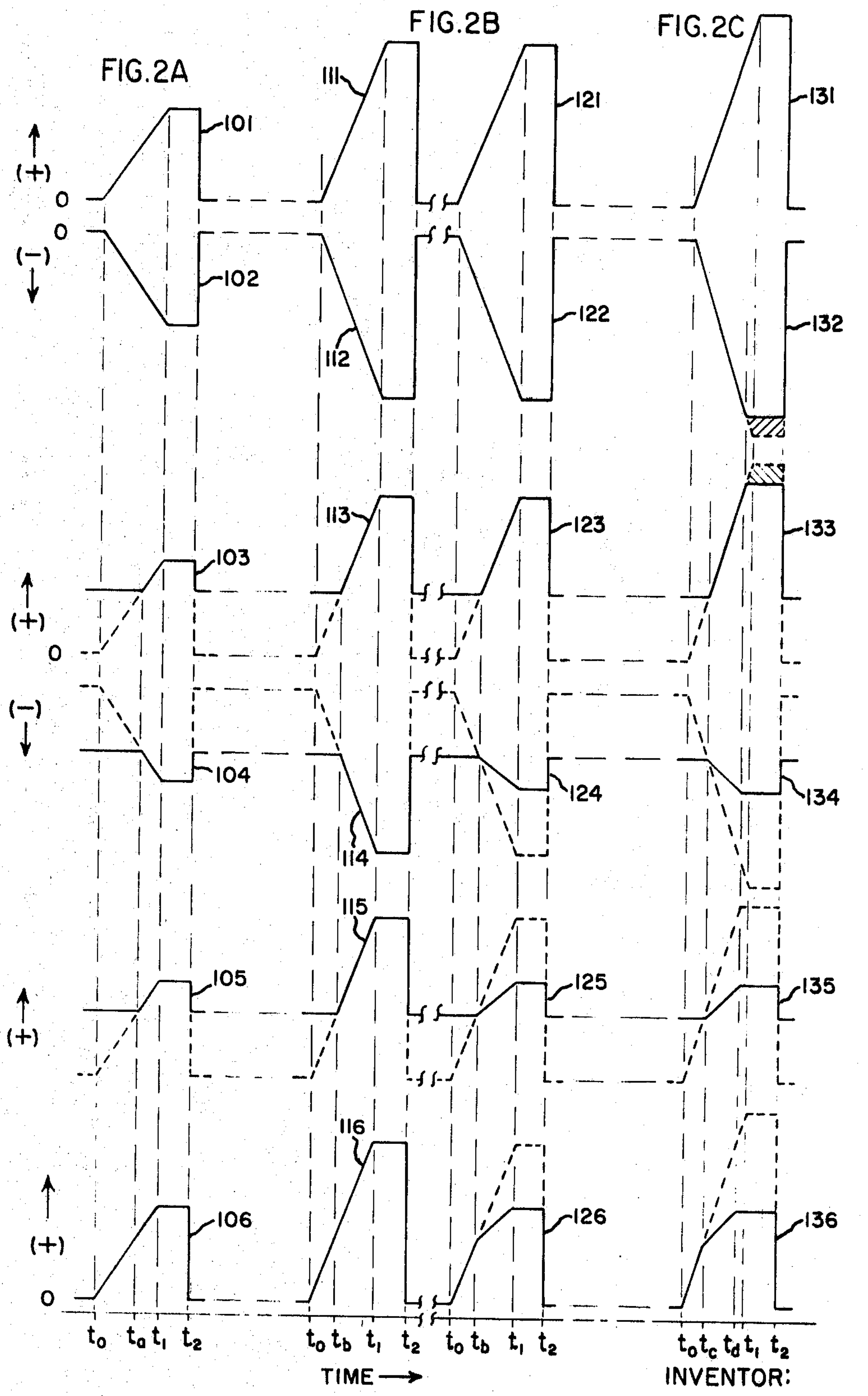
FIG. 2A illustrated waveforms at various points in the circuit of FIG. 1 when the input signal is as at or below a normal amplitude level.
FIG. 2B illustrates waveforms at various points in the circuit of FIG. 1 when the input signal is above a normal amplitude level so as to initiate signal compression above a predetermined amplitude.
FIG. 2C illustrates waveforms at various points in the circuit of FIG. 1 when the input signal is sufficiently above a normal amplitude level to initiate both white clipping of the video signal and compression of the video signal above a predetermined amplitude.

Under video input signal conditions such as represented by waveform 101 of FIG. 2A, transistor 12 becomes increasingly conductive as base voltage thereon increases from zero in the positive direction. At time $t_1$, transistor 12 reaches a maximum level of conduction, which is maintained until time $t_2$, at which time transistor 12 abruptly becomes substantially nonconductive due to the drop in transistor 12 base voltage to zero. The interval $t_0$ to $t_2$ represents the time required to scan one horizontal line. During the interval from $t_0$ to $t_1$, transistor 20 remains at a constant level of conduction with its emitter potential maintained at an amplitude sufficiently above the anode potential on diode 25 to cause diode 25 to be nonconductive. Conduction of transistor 12 during this time, however, is insufficient to reverse bias diode 17. Accordingly, diode 17 remains conductive throughout the entire interval from $t_0$ to $t_2$ so that no clipping is accomplished thereby. As a result, no clipping is produced by white clipper 10, and the output signal furnished by white clipper 10 to phase inverter 26 is of configuration illustrated by waveform 101. Consequently, the output signal produced by phase inverter 26 is represented by waveform 102.

The output signal produced by white clipper 10 is also furnished to the base of transistor 31 of black clipper 30. As voltage on the base of transistor 31 increases from zero in the positive direction, transistor 31 becomes increasingly less conductive. At time $t_1$, transistor 31 reaches a minimum level of conduction, which is maintained until time $t_2$, at which time transistor 31 abruptly becomes fully conductive due to the drop in transistor 31 base voltage to zero. During the interval from $t_0$ to $t_A$, transistor 40 remains at a constant level of conduction with its emitter potential maintained at an amplitude sufficiently above the cathode potential on diode 45 to cause diode 45 to conduct in the forward direction. Conduction of transistor 31 during the initial portion of this time, however, maintains diode 35 reverse-biased until base voltage on the transistor rises to a predetermined amplitude, as determined by conduction of transistor 40 which, in turn, depends on the setting of potentiometer 41. During this time, which extends from $t_0$ to $t_a$, potential on the cathode of diode 35 is at a constant value $V_C$, as determined by the level of conduction of transistor 40 in response to the setting of potentiometer 41.

Therefore, as long as base voltage on transistor 31 exceeds amplitude $V_C$, insufficient emitter current flows through resistance 34 to maintain the anode potential on diode 35 low enough to reverse-bias the diode. As a result, diode 35 becomes conductive at time $t_a$ and output voltage from black clipper 30, which appears on the cathode of diode 35, substantially follows the emitter voltage on transistor 31. At time $t_2$, however, when emitter voltage on transistor 31 returns abruptly to zero, diode 35 again becomes reverse-biased because emitter potential on transistor 31 falls below voltage $V_C$. At this juncture, diode 35 again becomes nonconductive, and amplitude of voltage on the cathode of diode 35 remains constant at amplitude $V_C$. Under these conditions, the waveform furnished to adder 27 from black clipper 30 is illustrated by the solid portion of waveform 103 in FIG. 2A. For comparison purposes, the dotted portion of waveform 103 represents the voltage on the emitter of transistor 31. The configuration of waveform 103 makes it evident that in switching from conduction to nonconduction and vice versa, diode 35 produces negligible nonlinear distortion in output voltage of black clipper 30. This is because the emitter follower circuit of transistor 40 presents a low output impedance to diode 35 and hence is substantially unaffected by the switching of diode 35.

Output signals from black clipper 30 are also furnished to the base of transistor 51 in controlled voltage attenuation circuit 50. Thus, a signal of waveform as illustrated by the solid line portion of waveform 103 of FIG. 2A is supplied to the base of transistor 51 and, since transistor 51 is connected in an emitter follower configuration, the voltage across resistance 53 assumes essentially the same waveform shape as that applied to the base of transistor 51. This signal is coupled through inductance 54 and fixed attenuating means comprising resistances 55 and 61 to the base of transistor 60. Due to the voltage drop across collector load resistance 63, collector voltage on transistor 60 is opposite in phase to the voltage on the base thereof, and hence may be illustrated by the solid line portion of waveform 104 of FIG. 2A. This waveform is furnished to the third input of adder circuit 27. For comparison purposes, the dotted portion of waveform 104 represents the output signal produced by phase inverter 26.

With a signal as represented by the solid line portion of waveform 104 applied to the base of transistor 60, the signal appearing on the emitter of the transistor is of the same phase as that on the base thereof, and hence may be represented by the solid line portion of waveform 105 of FIG. 2A. For comparison purposes, the dotted portion of waveform 105 represents the voltage on the emitter of transistor 31. The signal on the emitter of transistor 60 is furnished to level detector 65. However, potentiometer 66 is preset so that when a video input signal of amplitude ranging between zero and the level represented by the maximum amplitude of waveform 101 is furnished to the base of transistor 12, no output signal is produced by the level detector. Thus, no output signal is furnished to integrating DC amplifier 67, so that the gates of FETs 56 and 58 are maintained at ground potential. As a result, the FETs present extremely high drain-to-source impedances, so that for all practical purposes it may be assumed that they are each open-circuted between their respective source and drain electrodes. With both FETs 56 and 58 in high impedance or low conductivity conditions, no voltage attenuation is produced by circuit 50. Consequently, adder 27 receives input signals corresponding to the solid line portions of waveforms 102, 103 and 104, respectively at each of its inputs. The net result is that the solid line portion of waveform 103, being of polarity opposite to that of waveforms 102 and 104, subtracts from the sum of the solid line portions of waveforms 102 and 104. The algebraic sum of the solid line portions of waveforms 102, 103 and 104 is thereupon inverted by adder 27, resulting in an output signal of waveform 106, as illustrated in FIG. 2A. It can be seen that there is essentially no change in output waveform 106 from that of input waveform 101.

Video Input Signal Amplitude Above Normal Level But Below White Clipping Level

Now assume that a portion of the scene being viewed by the television camera is extremely bright, in relation to the remainder of the scene. This condition may be simulated, for purposes of determining operation of the circuitry, by applying an input signal comprising a train of identical pulses occurring at horizontal line frequency rate, such as waveforms 111 and 121 illustrated in FIG. 2B, to the circuitry of FIG. 1. While waveform 111 represents the initial pulse of a pulse train, waveform 121 represents a pulse which occurs several pulses, or several horizontal lines, later. These waveforms, each of which extends for the duration of a single horizontal line, are of insufficient amplitude to produce white clipping; consequently, the output signal of phase inverter 26, in response to waveforms 111 and 121 of the output signal of white clipper 10 appearing at the anode of diode 17, is illustrated by waveforms 112 and 122, respectively, in FIG. 2B. These waveforms are furnished to the first input of adder circuit 27.

The signal furnished to black clipper 30 from white clipper 10 is applied to the base of transistor 31. As previously described, the input signal on the base of transistor 31 produces an in-phase output signal on the emitter of the transistor. With the cathode of diode 35 biased at a potential controlled by the setting of potentiometer 41 in black clipper 30, the output signal produced by black clipper 30 at the cathode of diode 35 is maintained at a constant positive potential $V_C$ from $t_0$ until time $t_b$ when voltage on the emitter of transistor 31 rises above voltage $V_C$. Voltage $v_C$, as previously described, is determined by the amplitude of positive bias applied to the cathode of diode 35 by transistor 40 in response to the setting of potentiometer 41.

Starting at time $t_b$, the output voltage produced by black clipper 30 essentially follows the emitter voltage on transistor 31; that is, the output voltage of black clipper 30 rises to the maximum value, which occurs at time $t_1$, remains at the maximum value until time $t_2$, and then abruptly falls again, but only to the value $V_C$ even through the emitter voltage falls to a value of essentially zero. This is because diode 35 becomes substantially nonconductive when its anode voltage falls below amplitude $V_C$, and output potential produced by black clipper 30 is thereupon maintained at value $V_C$ through forward-biased diode 45. The waveforms resulting from input waveforms 111 and 121, are illustrated by the solid line portions of waveforms 113 and 123, respectively. For comparison purposes the dotted portions of waveforms 113 and 123 represent the voltage on the emitter of transistor 31. It should be noted that because of the steeper rise in waveforms 111 and 121 of FIG. 2B in comparison with the rise of waveform 101 in FIG. 2A, instant $t_b$ in FIG. 2B occurs earlier in each waveform than instant $t_a$ in FIG. 2A.

The solid line portions of waveforms 113 and 123 of FIG. 2B are furnished to the second input of adder 27 and, in addition, are furnished to the base of transistor 51 controlled voltage attenuation circuit 50. As previously described, transistor 51 produces an output signal at its emitter electrode of essentially the same waveform shape as that applied to the base of the transistor. As a result, the voltage appearing on the emitter of transistor 51 is substantially identical to the pulses represented by the solid line portions of waveforms 113 and 123 of FIG. 2B. This output signal of transistor 51 is furnished through inductance 54 and resistances 55 and 61 to the base of transistor 60.

Prior to occurrence of video input waveform 111, FETs 56 and 58 are assumed to be in their substantially nonconductive conditions. Accordingly, in response to wave form 111, a waveform substantially indentical to the solid line portion of waveform 113 in FIG. 2B appears on the emitter of transistor 60. This waveform is furnished from the emitter of transistor 60 to level detector 65 and, as this waveform is of greater maximum amplitude than the DC voltage furnished to level detector 65 by potentiometer 66, the level detector produces an output signal. This output signal is initiated when the amplitude of voltage furnished to level detector 65 from circuit 50 exceeds the voltage setting of potentiometer 66, and occurs subsequent to time $t_b$.

The output signal of level detector 65 is furnished through integrating DC amplifier 67 and, after a delay in the order of several horizontal lines duration, is furnished through diode 68 to the gates of FETs 56 and 58. The amplitude of voltage supplied to the gates of the FETs is dependent upon the amplitude of signal supplied to level detector 65. As a result, FETs 56 and 58 present greatly decreased source-to-drain impedances, depending upon the amplitude of output signal produced by level detector 65. Accordingly, FETs 56 and 58 furnish relatively low impedance paths from the junction of resistances 55 and 61, and the junction of resistance 61 and the base of transistor 60, respectively, to ground through resistance 43 and the impedance of the positive voltage source. In this manner, attenuation introduced by controlled voltage attenuation circuit 50 is sharply increased.

The effect of this sharp increase in attenuation is visible when comparing the solid line portion of the later-occurring waveform 124 of FIG. 2B, produced at the collector of transistor 60 as a result of waveform 121, with the solid line portion of the first waveform 114 produced at the collector of the transistor. Thus, the solid line portion of waveform 114 corresponds substantially to the inverse of the solid line portion of waveform 113. However, when the amplitude of waveform 113 reaches the amplitude set by potentiometer 66, an output signal produced by level detector 65 is furnished to integrating DC amplifier 67. This signal is delayed by amplifier 67 so as to have no immediate effect on the gates of FETs 56 and 58. However, after a predetermined interval in the order of several horizontal lines, amplifier 67 furnishes a signal to the gates of FETs 56 and 58, causing the FETs to become conductive. As a result, the negative amplitude of the solid line portion of waveform 124, appearing on the collector of transistor 60, abruptly reaches a maximum which is maintained constant throughout the remaining duration of waveform 114. This maximum, which is of lower amplitude than the peak of waveform 114, is determined by the setting of potentiometer 66. Again, for comparison purposes, the dotted portion of each of waveforms 114 and 124 represents the output signal produced at different times by phase inverter 26.

The rate of decay of output signal of integrating DC amplifier 67 is such that the voltage applied to the gates of FETs 56 and 58 as a result on one video input pulse is maintained until several hundred subsequent video input pulses are produced. The rate of decay of output signal from amplifier 67 is much slower than the rate of buildup of output signal therefrom since, on buildup, the large gain of level detector 65 tends to overdrive amplifier 67 by applying a large amplitude input signal thereto. This causes rapid acquisition of charge on an integrating capacitor there (not shown). During signal decay, however, charge leaks off the integrating capacitor relatively slowly. As a result, rise time of output signal from amplifier 67 is much shorter than decay time thereof. Thus, as soon as waveform 123, which is identical in configuration to waveform 113, begins to increase in amplitude from level $V_C$, the solid line portion of waveform 124 also begins to increase in amplitude in the negative direction, but at a slower rate than waveform 114 due to the added attenuation in controlled voltage attenuation circuit 50 provided by FETs 56 and 58, which are still in relatively low impedance conditions as a result of video input waveform 111. Hence, when the negative amplitude of the solid line portion of waveform 124 reaches the level set by potentiometer 66, FETs 56 and 58 still highly conductive, serve to maintain the maximum negative amplitude of the solid line portion of waveform 124 constant, for its remaining duration, at the value determined by the setting of potentiometer 66. Each video input waveform produced subsequent to waveform 121, and being assumed to be of the same waveform configuration, results in a respective pulse on the collector of transistor 60 which is identical in configuration to the solid line portion of waveform 124. It should be noted that the inverse of the solid line portions of waveforms 114 and 124, corresponding to the solid line portions of waveforms 115 and 125, respectively, in FIG. 2B, appear on the emitter of transistor 60. For comparison purposes, the dotted portion of each of waveforms 115 and 125 represents the voltage on the emitter of transistor 31.

The solid line portions of waveforms 112, 113 and 114 are furnished simultaneously to adder 27. As a result, the solid line portion of waveform 113, being positive-going, is subtracted from the sum of waveform 112 and the solid line portion of waveform 114, which are both negative-going. This results in waveform 116 being produced by adder 27 and, since adder 27 is an inverting circuit, waveform 116 is the inverse of the algebraic sum of the solid line portions of waveforms 112, 113 and 114. For comparison purposes, waveform 116 corresponds to video input waveform 111.

When waveform 121 is provided at the video input to the circuit, adder 27 receives the solid line portions of waveforms 122, 123 and 124 at its respective inputs. As a result, the solid line portions of negative-going waveforms 122 and 124 totaled, and the solid line portion of positive-going waveform 123 is subtracted from the sum thus derived, to produce a waveform of configuration corresponding to the solid line portion of waveform 126 at the output of adder 27. Again, for comparison purposes, the dotted portion of waveform 126 corresponds to video input waveform 121. Thus, while the first video input waveform 111 supplied to the circuit of FIG. 1 produces a waveform of configuration illustrated by waveform 116 in FIG. 2B, video input pulses furnished to the circuit several pulses later, if identical to waveform 111, result in an output waveform of the type illustrated by the solid line portion of waveform 126 of FIG. 2B.

It will be appreciated that the duration of maximum amplitude of the solid line portion of waveform 126 is identical to that of waveform 106 of FIG. 2A; that is, both durations extend for intervals $t_2 - t_1$. Accordingly, while the maximum amplitude of video input signal is maintained by the circuit of FIG. 1 at a level determined by the setting of potentiometer 66, the waveform configuration at the peak amplitude is preserved. By so doing, details in the bright portions of the scene being viewed are retained; that is, the portion of input signal of amplitude in excess of level $V_C$, as determined by the conductivity of transistor 40 in response to the setting of potentiometer 41, is effectively compressed above level $V_C$ and below the threshold determined by the setting of potentiometer 66. Thus, while the maximum amplitude of the portion of input signal in excess of level $V_C$ is appreciably reduced, the instants $t_b$, $t_1$ and $t_2$ at which this portion of input signal begins to rise, reaches its peak, and begins to fall, respectively, are all preserved unchanged. Similarly, the entire portion of the input signal below level $V_C$ is also preserved. Accordingly, the amount of distortion of large amplitude video input signals caused by the gain control circuit is minimal; that is, the general configuration of the large amplitude input pulse is substantially preserved, so that detail in the high amplitude signal portion, or bright portion of the image, is preserved.

Video Input Signal Amplitude Above White Clipping Level

To simulate the condition in which white portions of the scene being viewed by the camera employing the gain control circuitry of FIG. 1 are of even greater brightness than previously considered, a still larger amplitude waveform 131, shown in FIG. 2C, is applied to the video input of the circuit of FIG. 1. The amplitude of waveform 131 is sufficiently high such that diode 17 of white clipper circuit 10 becomes reverse-biased when the input waveform approaches its peak. That is, the waveform on the emitter of transistor 12, which very closely approximates the waveform of the signal applied to the base of transistor 12, has a maximum amplitude which exceeds the amplitude of voltage on the anode of diode 17.

When the amplitude of voltage on the emitter of transistor 12 rises above a value equal to the voltage on the anode of diode 17 minus the forward voltage drop across the diode, any further increase in voltage amplitude on the emitter of transistor 12 tends to raise the impedance of diode 17 by biasing the diode at a voltage amplitude below that necessary to maintain the diode in its conductive condition. As a result, any further increase in voltage amplitude on the emitter of transistor 12 has no effect on the anode voltage of diode 17. Accordingly, the output voltage of white clipper 10 reaches a limiting amplitude even though the input voltage may be continuing to increase in amplitude. The amplitude-limited waveform is inverted by phase inverter 26, resulting in the solid line waveform 132 of FIG. 2C. The dotted portion of waveform 132 enclosing a crosshatched region represents the additional negative amplitude which would be produced by phase inverter 26 if the output voltage of white clipper 10 were not limited by the clipping action of diode 17. The solid line portion of waveform 132 is thus supplied to the first input of adder circuit 27.

Those skilled in the art will appreciate the fact that, in maintaining a predetermined voltage on the anode of diode 17, transistor 20 and its associated circuitry function in a manner similar to that of transistor 40 and its associated circuitry to maintain a predetermined cathode potential on diode 35 of black clipper 30, as previously described. Thus, the amplitude of voltage on the anode of diode 17 is manually adjusted by the setting of potentiometer 21 in substantially the same manner by which voltage on the cathode of diode 35 is manually adjusted by the setting of potentiometer 41.

The output signal produced by white clipper 10 is also furnished to the input of black clipper 30, and the output signal of black clipper 30 may thus be represented by the solid line portion of waveform 133 shown in FIG. 2C. The crosshatched portion of waveform 133 represents the portion of the input waveform removed by white clipper 10 as described above. The solid line portion of waveform 133 is furnished to the second input of inverting adder 27 in the manner described previously.

The solid line portion of waveform 133, shown in FIG. 2C, is also applied to the base of transistor 51 in controlled voltage attenuation circuit 50. The effect on the collector of transistor 60, of applying waveform 133 to the base of transistor 51, is illustrated by the solid line portion of waveform 134 of FIG. 2C, which corresponds to a subsequent pulse on the collector of transistor 60 resulting from the first pulse in a train of pulses each of configuration represented by waveform 131. For comparison purposes, the dotted portion of waveform 134 represents the output signal produced by phase inverter 26.

An analysis of operation of the circuit of FIG. 1, similar to that made in explaining how waveforms 125 and 126 of FIG. 2B are formed, reveals that the solid line portion of waveform 135 of FIG. 2C appears on the emitter of transistor 60 and the solid line portion of waveform 136 of FIG. 2C is produced by adder 27. For comparison purposes, the dotted portion of waveform 135 represents the voltage on the emitter of transistor 31, while the dotted portion of waveform 136 corresponds to video input waveform 131. It should be noted that the effect of FETs 56 and 58, under conditions represented by the waveforms of FIG. 2C, is to attenuate the signal furnished to the base of transistor 60 between times $t_c$ and $t_d$, where $t_c$ represents the instant at which waveform 133 begins to rise from amplitude level $V_C$ and $t_d$ represents the instant at which the solid line portion of waveform 133 reaches its maximum value, or the time at which white clipper 10 begins to clip. As a result, the solid line portions of waveforms 134, 135 and 136 exhibit a constant maximum amplitude level for an interval $t_2 - t_d$, which is greater than interval $t_2 - t_1$. By comparison with waveform 126 of FIG. 2B, it is evident that the only effect of white clipper 10 on output signals produced by the gain control circuit of FIG. 1 in response to large amplitude input signals is to lengthen the interval during which the solid line portion of waveform 136 is at its maximum amplitude and to steepen the slope of the solid line portion of waveform 136 during the interval $t_d - t_c$. Accordingly, the solid line portion of output waveform 136 as a compressed version of an input pulse of waveform 131 is only slightly more distorted than the solid line portion of output waveform 126 as a compressed version of an input pulse of waveform 121 in FIG. 2B.

It should be noted that the purpose of white clipper 10 in FIG. 1 is to prevent the gain control circuit from reacting to small, extremely bright spots in the viewed scene. For example, in an outdoor sports event where half of the playing field is in shadow and half in bright sn sunlight, a small shiny or highly reflective object in the bright half of the field, such as a metal pail, may produce an extremely bright glint. It is desirable that controlled voltage attenuation circuit 50 not react to the glint signal, as simulated by waveform 131 of FIG. 2C, since relative brightness of the dark portion of the image being viewed might be reduced to a level incapable of displaying an acceptable amount of visually perceptible detail therein. Accordingly, white clipper 10 reduces the glint signal to a level no brighter than the maximum brightness of signal which controlled voltage attenuation circuit 50 is intended to accept, preventing any unduly large decrease in relative brightness of the dark portion of the image being viewed.

General Considerations

From the waveforms of FIGS. 2B and 2C it can be seen that the circuit of FIG. 1 limits the maximum output signal amplitude produced in response to a large amplitude video input signal. This is accomplished by splitting the video input signal into high and low amplitude portions about black clipping level $V_C$ and compressing only the higher amplitude portion of the large amplitude input signal, without modifying the lower amplitude portion thereof in any way. In this manner, detail in extremely bright portions of a scene including bright and dark portions, as viewed by a television camera, is in large measure preserved without incurring any loss of detail in the dark portions. As a result, the maximum contrast ratio capability of the camera which is actually usable extends beyond 120 to 1.

Inverted vertical blanking pulses may also be furnished to the anode of diode 71. These positive-going pulses occur only at the beginning and end of each image field, and hence occur at twice the frame rate, or 60 Hz. For purposes of comparison, the video input signals furnished to white clipper 10 occur at a horizontal line rate, or 15,750 Hz. Accordingly, at the beginning and end of each field, FETs 56 and 58 are driven into their highly conductive conditions, thereby introducing maximum attenuation in controlled voltage attenuation circuit 50. The purpose of introducing this large attenuation is to prevent any spurious signals occurring close to the upper and lower portions of the frame from affecting controlled voltage attenuation circuit 50. Such spurious signals may occur in some television systems as a result of what is known as lateral leakage of vidicons; that is, where the electron beam of the vidicon cannot scan the uppermost and lowermost portions of the face of the vidicon, which portions are nevertheless exposed to light from the scene being viewed, an electrostatic charge builds up close to the upper and lower edges of the vidicon faceplate. This builtup charge may produce a very large amplitude output signal as the electron beam scans the region nearby, actuating level detector 65 and amplifier 67 to hold FETs 56 and 58 conductive for several fields duration. If these spurious signals occur at a rate of once per frame, for example, it can be seen that controlled voltage attenuation circuit 50 might remain continuously in its maximum attenuation condition and interfere with proper operation of the gain control circuit. To obviate such condition, therefore, circuit 50 is driven into its maximum attenuation condition only momentarily by each inverted vertical blanking pulse, for the duration of the pulse, to attenuate the aforementioned spurious signals. Upon completion of each inverted vertical blanking pulse, circuit 50 reverts to the condition in which it is being maintained by the output of amplifier 65.

The foregoing describes a television camera capable of reproducing, with greater overall detail than heretofore deemed possible, images having high contrast ratios. The camera includes circuitry which permits it to reproduce, with a high degree of detail, a very bright portion of a scene being viewed by the camera without any loss of detail in a dark portion of the scene. The apparatus operates by compressing, only above a predetermined threshold amplitude, the video signal produced by the television camera, providing the camera with a usable maximum contrast ratio capability of at least 120 to 1.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A gain control circuit for extending the contrast range response capability of a television camera, said circuit comprising:

first circuit means responsive to the video signal produced by said camera for splitting said signal into high and low amplitude portions about a predetermined first amplitude level;

second circuit means coupled to said first circuit means for controllably compressing the high amplitude portion of said video signal when the maximum amplitude of said high amplitude portion exceeds a predetermined second amplitude level, said second amplitude level being greater than said first amplitude level; and algebraic adder means responsive to said video signal produced by said camera and coupled to said first and second circuit means, said algebraic adder means subtracting the high amplitude portion of said video signal from the sum of said signal plus the compressed high amplitude portion of said video signal so as to produce a composite signal comprising the sum of the low amplitude and compressed high amplitude portions of said video signal.

2. The apparatus of claim 1 including level detector means coupled to said second circuit means, said level detector means sensing the maximum amplitude of the high amplitude portion of said video signal and controlling the amount by which said second circuit means compresses the high amplitude portion of said video signal whenever the maximum amplitude of said high amplitude portion exceeds said second amplitude level.

3. The apparatus of claim 1 including level detector means coupled to said second circuit means and producing an output signal varying in accordance with the maximum amplitude of the high amplitude portion of said video signal above said second amplitude level, and integrating means coupling the output of said level detector means to said second circuit means, said integrating means delaying the effect of application of said output signal from said level detector means on said second circuit means, said second circuit means compressing the high amplitude portion of said video signal in response to the level detector output signal received for an extended duration from said integrating means.

4. The apparatus of claim 3 including video signal amplitude limiting means coupled to the input of said first circuit means and limiting the maximum amplitude of said video signal furnished to said first circuit means to a predetermined third amplitude level, said third amplitude level being greater than said second amplitude level.

5. The apparatus of claim 3 wherein said second circuit means includes fixed signal attenuating means coupling said first circuit means to said level detector means, and third circuit means coupled to said fixed signal attenuating means for controllably adding attenuation to said fixed signal attenuating means in response to output signal amplitude of said integrating means.

6. The apparatus of claim 5 including video signal amplitude limiting means coupled to the input of said first circuit means and limiting the maximum amplitude of said video signal furnished to said first circuit means to a predetermined third amplitude level, said third amplitude level being greater than said second amplitude level.

7. A television camera gain control circuit with extended contrast range response comprising:

means for clipping a video signal at a predetermined first amplitude level;

controlled voltage attenuation circuitry coupled to said clipping means and preset to attenuate a video signal of amplitude above said first amplitude level whenever said video signal exceeds a predetermined second amplitude level, said second amplitude level being greater than said first amplitude level; and algebraic adder means coupled jointly to the input and output of said means for clipping the video signal and to the output of said controlled voltage attenuation circuitry for subtracting the portion of video signal above said first amplitude level from the sum of said video signal plus the output signal of said controlled voltage attenuation circuitry so as to produce an amplitude limited video signal which retains detail in the signal representative of the dark portion of a scene being viewed by said camera while preserving most of the detail in the signal representative of the light portion of said scene.

8. The apparatus of claim 7 including additional clipping means coupled to the input of said means for clipping the video signal at a third amplitude level, said additional clipping means clipping said video signal at a third amplitude level above said second amplitude level.

9. The apparatus of claim 7 including level detector means coupled to said controlled voltage attenuation circuitry and responsive to the portion of video signal above said second amplitude level, and integrating means responsive to said level detector means, said integrating means being coupled to said signal attenuating means for controlling the amount of attenuation of said portion of video signal above said first amplitude level in accordance with the amplitude by which said portion of video signal above said first amplitude level exceeds said second amplitude level.

10. The apparatus of claim 8 including level detector means coupled to said controlled voltage attenuation circuitry and responsive to the portion of video signal above said second amplitude level, and integrating means responsive to said level detector means, said integrating means being coupled to said signal attenuating means for controlling the amount of attenuation of said portion of video signal above said first amplitude level in accordance with the amplitude by which said portion of video signal above said first amplitude level exceeds said second amplitude level up to a maximum of said third amplitude level.

11. The apparatus of claim 9 wherein said controlled voltage attenuation circuitry includes fixed signal attenuating means coupling said clipping means to said level detector means, and circuit means coupled to said fixed signal attenuating means for controllably adding attenuation to said fixed signal attenuating means in response to said integrating means.

12. The apparatus of claim 11 wherein said fixed signal attenuating means comprises resistance means, and said circuit means comprises transistor means connected to said resistance means to provide an additional signal path from said resistance means, said signal path being of conductivity depending upon amplitude of output signal from said integrating means.

13. A gain control circuit for extending the contrast range response capability of a television camera, said circuit comprising:

first circuit means responsive to the video signal produced by said camera for splitting said signal into high and low amplitude portions about a predetermined first amplitude level;

second circuit means coupled to said first circuit means for controllably compressing the high amplitude portion of said video signal when the maximum amplitude of said high amplitude portion exceeds a predetermined second amplitude level, said second amplitude level being greater than said first amplitude level; and signal combining means coupled to said first and second circuit means, said signal combining means serving to add the compressed high amplitude portion of said video signal to the low amplitude portion of said video signal so as to produce a composite signal comprising the sum of the low amplitude and compressed high amplitude portions of said video signal.

14. The apparatus of claim 13 including level detector means coupled to said second circuit means and producing an output signal varying in accordance with the maximum amplitude of the high amplitude portion of said video signal above said second amplitude level, and integrating means coupling the output of said level detector means to said second circuit means, said integrating means delaying the effect of application of said output signal from said level detector means on said second circuit means, said second circuit means compressing the high amplitude portion of said video signal in response to the level detector output signal received for an extended duration from said integrating means.